June 26, 1956
A. STADLER
2,751,974
VENTURI TYPE PROPORTIONAL MIXER WITH MEANS FOR ADJUSTING
THE EFFECTIVE CROSS SECTIONAL AREAS OF THE ADJACENT
SMALL EXTREMITIES OF THE OUTWARDLY FLARED EXHAUST
AND INWARDLY TAPERED INTAKE PASSAGES THEREOF
Filed June 2, 1952
3 Sheets-Sheet 1
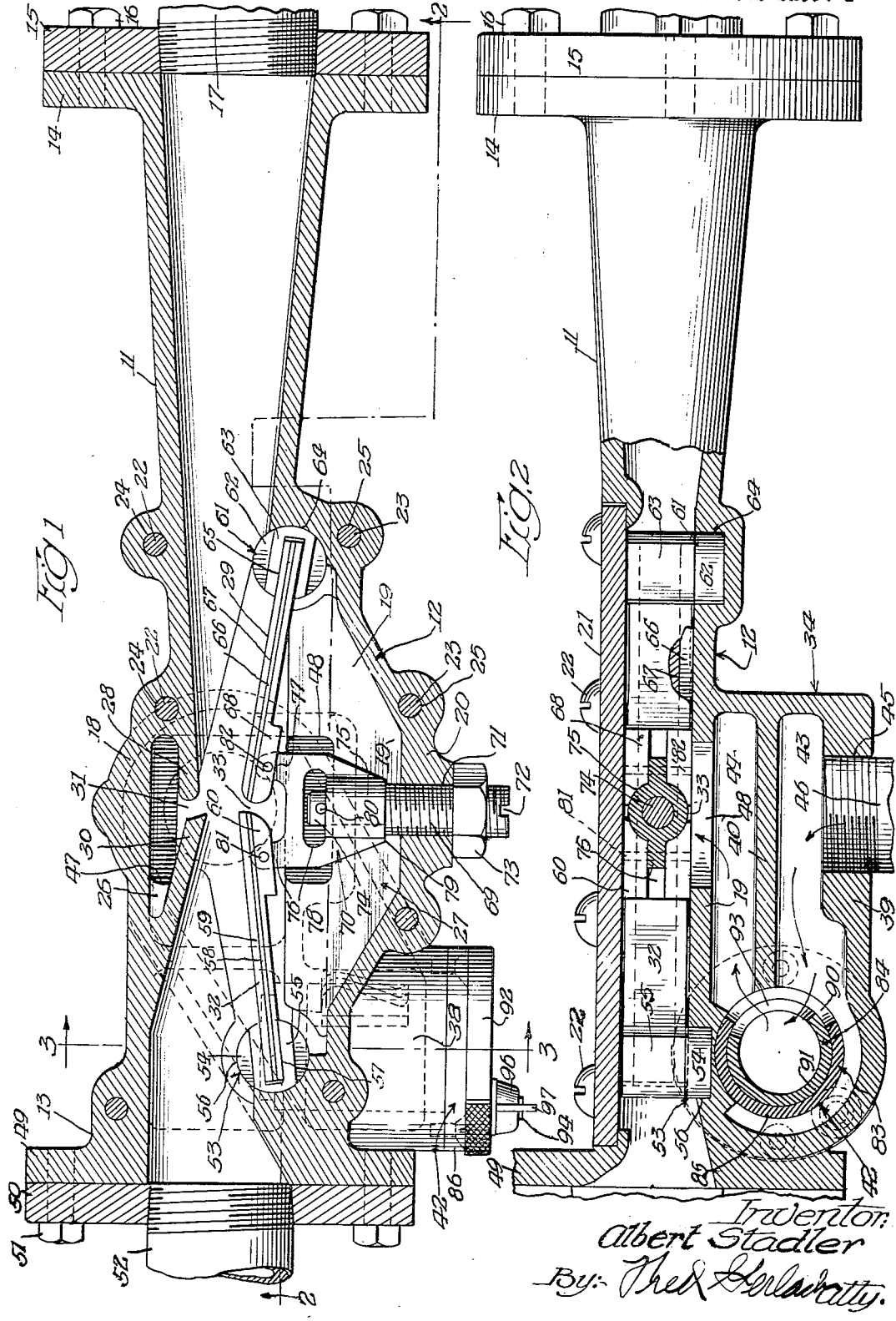
Inventor:
Albert Stadler
By:- Thos R Herlachatty

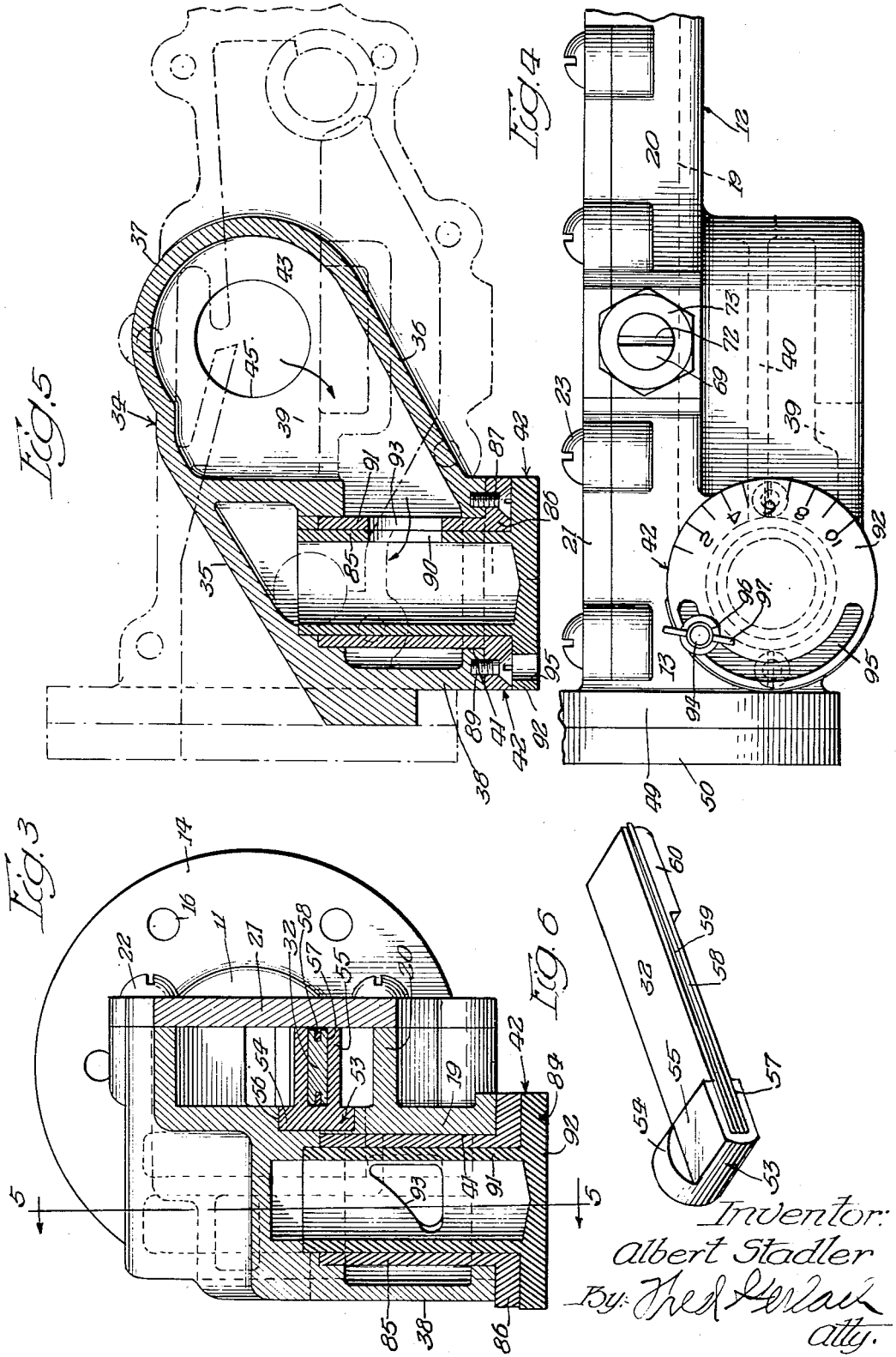

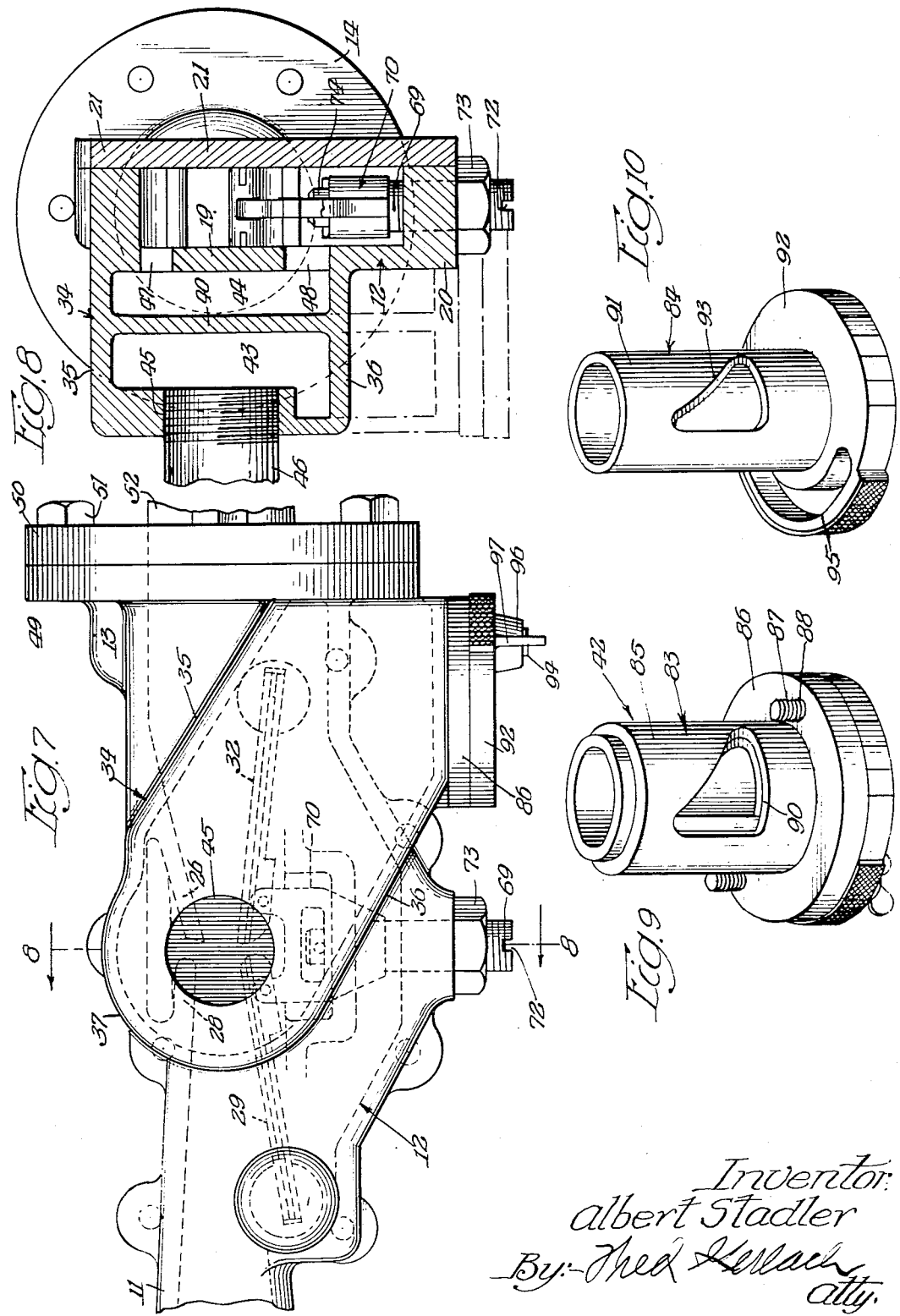

ns of United States Patent Office 2,751,974
Patented June 26, 1956

2,751,974

VENTURI TYPE PROPORTIONAL MIXER WITH MEANS FOR ADJUSTING THE EFFECTIVE CROSS SECTIONAL AREAS OF THE ADJACENT SMALL EXTREMITIES OF THE OUTWARDLY FLARED EXHAUST AND INWARDLY TAPERED INTAKE PASSAGES THEREOF

Albert Stadler, Rockford, Ill., assignor to Eclipse Fuel Engineering Co., Rockford, Ill., a corporation of Illinois Application June 2, 1952, Serial No. 291,154

4 Claims. (Cl. 158—118)

The present invention relates generally to low pressure proportional mixers of the Venturi variety. More particularly, the invention relates to that type of proportional mixer which is designed to form part of a system for supplying an air-gas fuel mixture to a burner arrangement (a single burner or a plurality of burners) and is in the form of an elongated hollow member which is formed for the most part of cast metal, has one end part thereof shaped to form an outwardly flared exhaust passage and provided at its outer extremity with means for connecting the large outer end of the exhaust passage to the burner arrangement, has the other end part thereof shaped to form an inwardly tapered intake passage with the inner extremity thereof in alignment but spaced apart relation with the inner extremity of the exhaust passage, provided at its outer extremity with means for connecting the large outer end of the intake passage to a source of air under super-atmospheric pressure, and adapted to direct the air under super-atmospheric pressure so that it enters and flows outwards through the exhaust passage after flowing through the intake passage, and has the intermediate part thereof arranged and shaped to form a suction chamber adjacent to and in communication with the inner extremities of the exhaust and intake passages and provided with means for connecting the chamber to a source of gaseous fuel under substantially gaseous pressure to the end that the fuel in the chamber is entrained by the air under super-atmospheric pressure directly before it enters the exhaust passage.

In connection with use of a low pressure proportional mixer of the aforementioned type optimum results can only be obtained when the size of the mixer is properly proportioned with respect to the burner arrangement with which it is used. In determining the correct or proper size of a mixer for a particular burner arrangement consideration must be given to the quantity of the air-gas fuel mixture that is to be burned by the burner arrangement, the size of the intake passage in order that it delivers the required amount of air at a pressure sufficient to assure proper combustion of the fuel mixture, and the fuel burning capacity of the burner or burners of the burner arrangement. If the mixer is too large for a particular burner arrangement due to an over-sized intake passage, the back pressure which is developed in the piping between the exhaust passage and the burner arrangement so reduces the suction in the suction chamber as to prevent entrainment of the proper amount of gas with the air under pressure emanating from the small inner end of the intake passage. If the mixer is too small for a particular burner arrangement due to an under-sized intake passage, the burner arrangement does not burn the fuel mixture at maximum capacity and, therefore, is highly inefficient. Because of the large number of different burner arrangements in use it has heretofore been necessary to employ many different sizes of low pressure proportional mixers. To a manufacturer of low pressure proportional mixers a large inventory of mixers of different sizes is costly and not economic.

The principal object of this invention is to provide a low pressure proportional mixer which is an improvement upon, and has certain inherent advantages over, previously designed mixers of the aforementioned type and is characterized by the fact that it embodies simple and novel means for varying the effective cross sectional areas of the inner extremities of the exhaust and intake passages to the end that the mixer, without change in overall size or substitution of parts, may be employed in connection with different burner arrangements which would normally require mixers of different sizes in order to produce desired or optimum results.

Another object of the invention is to provide a proportional mixer in which the exhaust-passage-forming part and the intake-passage-forming part of the hollow member embody at the inner end portions thereof wall structures which define elongated slot-like spaces at and in communication with the inner end portions of the exhaust and intake passages, and the means for varying the cross sectional areas of the inner extremities of the exhaust and intake passages consist of rigid strip-like parts which are disposed in, and shaped conformably to, the aforementioned elongated slot-like spaces and are provided at the ends thereof that are farther from the inner extremities of said passages with pivotal connections whereby they are permitted to swing laterally back and forth.

Another object of the invention is to provide a low pressure proportional mixer of the type and character under consideration and in which the pivotally mounted rigid strip-like parts are provided with simple and novel means for positively and conjointly swinging them back and forth and also releasably retaining them in the various positions into which they are swung.

A further object of the invention is to provide a proportional mixer of the aforementioned character and in which the suction-chamber-forming part of the hollow member is provided with a valve for regulating or controlling the flow of gaseous fuel to the suction chamber.

A still further object of the invention is to provide a proportional mixer which is generally of new and improved construction, embodies a simple and novel arrangement of parts, effectively and efficiently fulfills its intended purpose and is capable of being produced at a comparatively low cost and also adjusted with facility.

Other objects of the invention and the various advantages and characteristics of the present low pressure proportional mixer will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical longitudinal section of a Venturi type low pressure proportional mixer embodying the invention, illustrating in detail the construction, design and arrangement of the pivotally mounted rigid strip-like parts whereby the effective cross sectional areas or sizes of the inner extremities of the intake and exhaust passages may be increased or decreased;

Figure 2 is a horizontal section taken on the line 2—2 of Figure 1;

Figure 3 is a vertical transverse section taken on the line 3—3 of Figure 1 and showing the arrangement and location of the rotary valve for effecting adjustment of the air-gas ratio;

Figure 4 is a bottom elevation of the parts of the elongated hollow member that form the suction chamber and the intake passage;

Figure 5 is a vertical section on the line 5—5 of Figure 3;

Figure 6 is a perspective of the pivotally mounted rigid strip-like part for adjusting the effective cross sectional area of the inner extremity of the intake passage;

Figure 7 is a side elevation of the intake-passage-forming part and the suction-chamber-forming part of the elongated hollow member;

Figure 8 is a vertical transverse section on the line 8—8 of Figure 7;

Figure 9 is a perspective of the rotary valve for effecting adjustment or variation of the air-gas ratio; and Figure 10 is a perspective of the rotary part or member of the valve.

The Venturi type low pressure proportional mixer that is illustrated in the drawings constitutes the preferred form or embodiment of the invention. It is designed to form a part of a system for supplying an air-gas fuel mixture to a conventional burner arrangement (not shown). It is contemplated that the burner arrangement will be in the form of a single burner or a plurality of burners. Generally speaking a burner arrangement of the type with which the present proportional mixer is used consists of one or more burner tubes and is used as a medium or instrumentality for heating an oven or a furnace. The mixer is in the form of an elongated hollow member which is formed for the most part of a one-piece casting of aluminum or like light weight metal. The right hand end part of the member as viewed in Figures 1 and 2 is designated by the reference numeral 11 and is shaped to form an outwardly flared exhaust passage. The intermediate or central part of the member is designated by the reference numeral 12; and the left hand end part of the member as viewed in Figures 1 and 2 is designated by the reference numeral 13 and is shaped to form an inwardly tapered intake passage.

The exhaust-passage-forming part 11 of the elongated hollow member is flared in the direction of its outer end and embodies on its outer end an integral outwardly extending annular flange 14 and a ring shaped plate 15. The plate is shaped conformably to, and fits against the outer face of, the flange 14. It is removably secured to the flange by an annular series of bolts 16 and has an internal screw thread for connection to an external screw thread on one end of a pipe 17. It is contemplated that the other end of the pipe 17 will be suitably connected to the aforementioned burner arrangement. The flange 14 and the plate 15 together constitute the fuel mixture outlet of the mixer and also means whereby the large end of the exhaust-passage-forming part 11 of the elongated hollow member may be connected by piping to the burner arrangement with which the mixer is used. The outer end portion of said part 11 is preferably circular in cross section and the inner end portion of the part 11 is substantially rectangular in cross section. In connection with operation of the mixer the herein recited air-gas fuel mixture flows through the outwardly flared exhaust passage that is formed by the part 11 and is then conducted by the pipe 17 to the burner arrangement.

The intermediate part 12 of the elongated member is joined at one end thereof to the inner end portion of the exhaust-passage-forming part 11 and is joined at its other end portion to the inner end of the intake-passage-forming part 13. It embodies a top wall 18, a side wall 19, and a downwardly dished bottom wall 20. A removable plate 21 is arranged in opposed and spaced apart relation with the side wall 19 and constitutes the other side wall of the intermediate part 12. It is shaped conformably to the side wall 19 and is removably secured in place by horizontal bolts 22 and 23. The bolts 22 extend through holes in the upper marginal portion of the side plate 21 into screw threaded sockets 24 in the top wall 18 and the bolts 23 extend through holes in the lower marginal portion of the plate 21 into screw threaded sockets 25 in the bottom wall 20. The central portion of the top wall 18 and the upper central portions of the side wall 19 and the plate 21 define an upper suction chamber 26 and the bottom wall 20 and the lower portions of the side wall 19 and the plate 21 define a lower suction chamber 27. The top wall 18 of the hollow member 12 embodies an integral extension 28 on the end portion thereof that joins the upper portion of the exhaust-passage-forming part 11. The extension 28 defines or forms the upper portion of the inner extremity of the outwardly flared exhaust passage and underlies the end portion of the upper suction chamber 26 that faces in the direction of the end part 11 of the elongated hollow member. The portions of the side wall 19 and the removable plate 21 that directly underlie the extension 28 define the side portions of the inner or throat forming extremity of the outwardly flared exhaust passage. The end of the bottom wall 20 that joins the bottom portion of the inner end of the part 11, i. e., the right hand end of the bottom wall as viewed in Figure 1, is disposed an appreciable distance outwards of the right hand end of the integral extension 28 of the top wall 18. An elongated strip-like part 29 extends inwards and slightly upwards from the right hand end of the bottom wall 20 and constitutes the bottom portion of the inner end portion of the exhaust-passage-forming part 11. This part 29 is, in effect, a wall forming part of the inner end portion of the part 11 and will be described in detail hereafter. It overlies the end portion of the lower suction chamber 27 that faces in the direction of the end part 11, and is of such length that its inner end directly underlies the inner end of the extension 28 that defines the upper portion of the inner extremity of the outwardly flared exhaust passage 11. The top wall 18 of the hollow member 12 embodies an integral extension 30 on the end portion thereof that joins the upper portion of the inner end of the intake-passage-forming part 13 of the elongated hollow member. The extension 30 defines or forms the upper portion of the inner extremity of the inwardly tapered intake passage and underlies the end portion of the upper suction chamber 26 that faces in the direction of the end part 11 of the elongated hollow member. As best shown in Figure 1, the inner end of the extension 30 is spaced from the inner end of the extension 28. It is disposed a small distance beneath the inner end of the extension 28 and defines therewith a duct 31 leading downwards from the central portion of the upper suction chamber 26. The portions of the side wall 19 and the removable plate 21 that directly underlie the extension 30 define the side portions of the small or inner extremity of the inwardly tapered intake passage in the end part 13. The end of the bottom wall 20 that joins the bottom portion of the inner end of the intake-passage-forming part 13, i. e., the left hand end of the bottom wall as viewed in Figure 1, is disposed an appreciable distance outwards of the left hand end of the integral extension 30 of the top wall 18. An elongated strip-like part 32 extends inwards and slightly upwards from the left hand end of the bottom wall 20 of the hollow member and constitutes the bottom portion of the inner end portion of the part 13. This part 32 is, in effect, a wall-forming part of the small end of the intake-passage-forming part and will be described in detail hereafter. It overlies the end portion of the lower suction chamber 27 that faces in the direction of the part 13 of the elongated hollow member and is of such length that its right hand end directly underlies the right hand end of the extension 30. The right hand end of the strip-like part 32 is spaced from the left hand end of the part 29 and is disposed slightly above said end of the strip-like part 29, as shown in Figure 1, and defines therewith a duct 33 which communicates with, and leads upwards from, the central portion of the lower suction chamber 27.

The intermediate part 12 of the elongated hollow member embodies outwards of its side wall 19 an integral wall structure 34. The latter comprises a downwardly inclined top wall 35, a downwardly inclined bottom wall 36 in spaced relation with the top wall 35, a semi-circular upper end wall 37 between the upper ends of the top and bottom walls 35 and 36, a vertically extending partially cylindrical lower end wall 38, an outer side wall 39 and an intermediate side wall 40. The inner marginal portions of the top, bottom, upper end and lower end walls are joined to, and formed integrally with, the main side wall 19 of the intermediate part 12. The marginal portions of the outer side wall 39 of the wall structure 34 are joined to, and formed integrally with, the outer marginal portions of the top wall 35, the bottom wall 36, the upper end wall 37 and the lower end wall 38. The intermediate side wall 40 is spaced from, and disposed substantially midway between, the outer side wall 39 and the main side wall 19 and has the upper marginal portion thereof joined to, and formed integrally with, the top wall 35, its upper end portion joined to and formed integrally with, the upper end wall 37, and its bottom marginal portion joined to, and formed integrally with, the bottom wall 36. The lower end portion of the intermediate side wall is spaced from the inner periphery of the lower end wall 38 of the wall structure 34 and defines therewith a vertically extending substantially cylindrical chamber 41 for a rotary valve 42. The latter will be described in detail hereafter. The intermediate side wall 40 defines with the outer side wall 39 a downwardly inclined duct 43, the lower end of which leads to, and communicates with, the valve chamber 41. The intermediate side wall 40 defines with the main side wall 19 of the hollow member 12 an upwardly inclined duct 44, the lower end of which communicates with the valve chamber 41. The upper portion of the outer side wall 39 of the wall structure 34 is provided with a transverse screw threaded hole 45 whereby it is connected to one end of a pipe 46. It is contemplated that the other end of the pipe 46 will be connected to a conventional zero governor (not shown). It is also contemplated that the zero governor will be connected to a source of gas and serve to supply gas under zero or atmospheric pressure to the intermediate part 12 of the elongated hollow member by way of the pipe 46. The upper central portion of the side wall 19 is provided with an opening 47 for establishing communication between the upper suction chamber 26 and the upper portion of the duct 44 and the central lower portion of the side wall 19 is provided with an opening 48 for establishing communication between the lower suction chamber 27 and the central portion of the duct 44. When the mixer is in operation suction is produced in the upper and lower suction chambers 26 and 27 as hereinafter described and results in gas under zero or atmospheric pressure flowing from the aforementioned zero governor through the pipe 46, then downwards through the duct 43, then past the valve chamber 41, then upwards through the duct 44, then inwards through the openings 47 and 48 into the upper and lower suction chambers 26 and 27. Gas flows downwards from the upper suction chamber through the duct 31 and gas flows upwards from the lower suction chamber 27 through the duct 33.

The intake-passage-forming part 13 of the elongated hollow member is outwardly flared and is provided at its outer or large end with an outwardly extending integral annular flange 49 and a ring shaped plate 50. The plate is shaped conformably to, and fits against the outer face of, the flange 49. It is removably secured to the flange by an annular series of bolts 51 and has an internal screw thread for connection to an external screw thread on one end of a pipe 52. Such pipe is connected to a compressor (not shown) or any other suitable source of air under superatmospheric pressure and serves, when the mixer is in operation, to supply air under pressure through the inwardly tapered intake passage in the part 13. As illustrated in the drawing, the inner end portion of the part 13, like the inner end portion of the exhaust-passage-forming part 11, is substantially rectangular in cross section. In connection with mixer operation the air under pressure that flows through the inwardly tapered intake passage in the part 13 emanates from the small end of the intake passage in high velocity stream form and flows into and through the outwardly flared exhaust passage in the part 11. The air stream as it passes from the small end or inner extremity of the intake passage into the small end or inner extremity of the outwardly flared exhaust passage creates suction in the upper and lower suction chambers 26 and 27 and results in entrainment of gas. The entrained gas mixes with the air stream during flow of the air stream through the exhaust passage, as well understood in the art.

The strip-like part 32 which forms the lower portion of the inner end portion of the intake-passage-forming part 13 is disposed in, and shaped conformably to, an elongated slot-like space which is located at the bottom and lengthwise of the inner end portion of the intake passage and extends outwards from the inner extremity of said intake passage. It is pivotally mounted at its left hand end, i. e., the end that is farther from the inner extremity of the intake passage, by way of a pivot element 53 in order that it is free to swing to and from the extension 30 and thereby vary or adjust the effective cross sectional area of the small or inner extremity of the intake passage in the end part 13 of the elongated hollow member. It is formed of any suitable rigid material and is of such width that its side edges are disposed in substantially contacting relation with the adjacent portions of the side wall 19 and the removable plate 21 of the intermediate part 12. The pivot element 53 consists of a circular part 54 and a lug-like part 55 on one side of the circular part. The last mentioned part is rotatably mounted in a circular hole 56 which is formed in the side wall 19 directly above the left hand end of the bottom wall 20 as viewed in Figure 1 of the drawings. The lug-like part 55 of the pivot element 53 is the same in width as the strip-like part 32 and has a longitudinally extending notch 57 in which the inner end of the strip-like part 32 is slidably mounted. The pivot element 53 permits the strip-like part 32 to be swung upwards when it is desired to reduce the effective cross sectional area of the inner extremity of the inwardly tapered intake passage 13 and downwards away from the extension 30 when it is desired to increase the effective cross sectional area of the inner extremity of the intake passage. Air under pressure from the intake passage is prevented from flowing around the side edges of the strip-like part 32 into the lower suction chamber 27 by way of a pair of flexible sealing strips 58 of any suitable material. The inner side portions of these strips fit in longitudinally extending grooves 59 in the side edges of the strip-like part 32 and the outer side portions of the strips bear respectively against the adjacent portions of the side wall 19 and the removable plate 21. The outer end of the strip-like part 32 is provided with a pair of integral laterally spaced depending lugs 60.

The strip-like part 29 which forms the lower portion of the inner end portion of the exhaust-passage-forming part 11 is disposed in, and shaped conformably to, an elongated slot-like space which is located at the bottom and lengthwise of the inner end portion of the outwardly flared exhaust passage and extends outwards from the inner extremity of said exhaust passage. It is pivotally mounted at the end thereof that is farther from the inner extremity of the exhaust passage by way of a pivot element 61 in order that it is free to swing to and from the extension 28 and thereby vary or adjust the effective cross sectional area of the small end of the exhaust passage. It is formed of any suitable rigid material and is of such width that its side edges are disposed in substantially contacting relation with the adjacent portions of the side wall 19 and the removable plate 21 of the intermediate part 12 of the elongated hollow member. The pivot element 61 consists of a circular part 62 and a lug-like part 63 on one side of the circular part. The last mentioned part is rotatably mounted in a circular hole 64 which is formed in the side wall 19 directly above the right hand end of the bottom wall 20 as viewed in Figure 1. The lug-like part 63 of the pivot element 61 is the same in width as the strip-like part 29 and has a longitudinally extending notch 65 in which the outer end of the strip-like part 29 is slidably mounted. The pivot element 61 permits the strip-like part 29 to be swung upwards when it is desired to reduce the effective cross sectional area of the small end of the exhaust passage 11 and downwards away from the extension 28 when it is desired to increase the effective cross sectional area of the small end of the exhaust passage. Air under pressure from the inner portion of the exhaust passage is prevented from flowing around the side edges of the strip-like part 29 into the lower suction chamber 27 by way of a pair of flexible sealing strips 66 of any suitable material. The inner side portions of these strips fit in longitudinally extending grooves 67 in the side edges of the strip-like part 29 and the outer side portions of the strips bear respectively against the adjacent portions of the side wall 19 and the removable plate 21. The outer end of the strip-like part 29 is provided with a pair of integral laterally spaced depending lugs 68.

In addition to the parts heretofore mentioned the proportional mixer comprises means for conjointly swinging the strip-like wall forming parts 32 and 29 upwards and downwards. Such means comprises a vertically extending screw 69 and a vertically movable element 70 at the upper end of the screw. The central portion of the screw 69 extends through a vertically extending screw threaded hole 71 in the central portion of the bottom wall 19 of the intermediate part 12. The lower end of the screw is provided with a diametric kerf 72 whereby the screw may be turned by a screw driver or like turning tool. When the screw is turned in one direction it feeds upwards and when it is turned in the opposite direction it feeds downwards. A lock nut 73 is mounted on the lower end of the screw and serves, when tightened after longitudinally adjusting the screw to the desired extent, to lock the screw in place. The upper end of the screw is disposed in the lower central portion of the suction chamber 27 and is provided with an integral upwardly extending reduced cylindrical stem 74. The element 70 is vertically elongated and embodies at its lower end a vertically extending tubular part 75. It embodies at its upper end a pair of laterally spaced upstanding ears 76 and 77 and has in its central portion and directly above the upper end of the tubular part 75 a horizontally elongated cutout 78. The reduced stem 74 on the upper end of the screw 69 extends loosely through the tubular part 75 of the element 70 in order that the screw is permitted to rotate relatively to the member. The screw 69 has an annular shoulder 79 adjacent the lower end of its stem 74 and this shoulder abuts against the lower end of the tubular part 75 and causes the element 70 to move upwards in connection with upward feed of the screw. The upper extremity of the stem 74 is disposed in the cutout 78 and embodies a crosspin 80, the ends of which bear against the upper end of the tubular part 75 and cause the element 70 to move downwards in connection with downward feed of the screw 69. The upstanding ear 76 on the upper end of the element 70 is disposed between the depending lugs 60 and is pivotally connected to the inner end of the strip-like part 32 by a horizontal pivot pin 81 which extends through aligned holes in the lugs 60 and the ear 76. The other upstanding ear, i. e., the ear 77, is disposed between the depending lugs 68. It is pivotally connected to the inner end of the strip-like part 29 by a horizontal pivot pin 82 which extends through aligned holes in the lugs 68 and the ear 77. When it is desired to decrease the effective cross sectional areas of the inner extremities of the intake and exhaust passages the screw 69 is turned so that it feeds upwards and causes corresponding upward movement of the element 70 and resultant upward swinging of the strip-like parts 32 and 29. When it is desired to increase the effective cross sectional areas of the inner extremities of the intake and exhaust passages the screw is turned reversely so as to shift downwards the element 70 and cause resultant downward swinging of the parts 32 and 29. During swinging movement of such parts the inner ends of the parts slide in the notches 57 and 65. By adjusting the parts 32 and 29 the mixer, without change in overall size or substitution of parts, may be employed in connection with different burner arrangements which would normally require mixers of different sizes in order to produce desired or optimum results. The screw 69 and the element 70 together constitute simple means for conjointly adjusting the strip-like parts 32 and 29 without varying or changing their relative positions in a lateral direction.

The aforementioned valve 42 serves as a medium or instrumentality for varying or adjusting the air-gas ratio of the fuel mixture that emanates from the large end of the outwardly flared exhaust passage in the end part 11 of the elongated hollow member during operation of the mixer. It is of unitary character and comprises a body 83 and a rotary valve member 84. The body 83 is in the form of a vertically extending sleeve-like part 85 which fits within the valve chamber 41 and embodies at its lower end an integral outwardly extending annular flange 86. The latter fits against the bottom marginal portion of the lower end wall 38 of the wall structure 34 and is removably secured in place by means of screws 87 which extend through holes 88 in the flange into screw threaded sockets 89 in said lower marginal portion of the lower end wall 38. The sleeve-like part 85 of the body embodies a triangular port 90 which extends and establishes communication between the lower ends of the ducts 43 and 44. The rotary valve member 84 is in the form of a vertically extending sleeve-like part 91 which fits snugly and rotatably within the sleeve-like part 85 of the valve body 83 and embodies at its lower end an enlarged circular head 92, the rim portion of which underlies but abuts against the bottom face of the annular flange 86 on the lower end of the sleeve-like part 85. The sleeve-like part 91 of the rotary valve member 84 embodies a triangular port 93 which is the same in size as the port 90 and is disposed adjacent the latter. When the rotary valve member 84 is turned so that its port 93 is in registry with the port 90 the valve as a whole has maximum port area and permits of maximum flow of gas to the suction chambers 26 and 27 during mixer operation. When, however, the rotary valve member 84 is turned so that its port 93 is partially out of registry with the port 90 the last mentioned port has reduced effective area and hence results in a smaller amount of gas flowing into the two suction chambers. By turning or adjusting the rotary valve member 84 with respect to the valve body 83 the ratio of air to gas may be adjusted as desired. The valve 42 is, in effect, a gas ratio adjuster and has associated with it releasable means for securing the rotary valve member 84 in the various positions into which it is turned. Such means comprises a vertically extending screw 94. The latter extends through an arcuate slot 95 in the rim of the enlarged head 92 into a screw threaded socket in the annular flange 86 on the lower end of the sleeve-like part 85 of the valve body 83. When the screw 94 is loosened the rotary valve member 84 is permitted to turn in one direction or the other as determined by the length of the slot 95. Tightening of the screw 94 serves to lock the rotary valve member in place. The lower end of the screw has a head 96 at its lower end and this has a pair of outwardly extending diametrically opposite wings 97 whereby the screw may be loosened or tightened by manual manipulation.

The herein described low pressure proportional mixer effectively and efficiently fulfills its intended purpose and is capable of being produced at a comparatively low cost and also adjusted with facility. It is characterized by the fact that it includes the conjointly adjustable strip-like parts 32 and 29 whereby the effective cross sectional areas of the inner extremities of the intake and exhaust passages may be varied. By including the wall forming strip-like parts 32 and 29 the mixer has a wide range of use and, as previously pointed out, may be employed in connection with different burner arrangements which ordinarily would require mixers of different sizes in order to produce optimum results.

Whereas the mixer has been described as being in a certain position it is to be understood that the mixer may assume any desired angular position. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A Venturi type proportional mixer of the character described, comprising an elongated hollow member formed for the most part of cast material and having one end part thereof shaped to form an outwardly flared exhaust passage, provided at its outer extremity with means for connecting the large outer end of the exhaust passage to a burner arrangement, and embodying at its inner end portion a wall structure that defines an elongated slot-like space which is located at one side and lengthwise of the inner end portion of the exhaust passage and extends outwards from the inner extremity of said discharge passage, said member having the other end part thereof shaped to form an inwardly tapered intake passage with the inner extremity thereof in alignment but spaced apart relation with the inner extremity of the exhaust passage, provided at its outer extremity with means for connecting the large outer end of the intake passage to a source of air under super-atmospheric pressure, adapted to direct the air under super-atmospheric pressure so that it enters and flows outwards through the exhaust passage after flowing through said intake passage, and embodying at its inner end portion a wall structure that defines an elongated slot-like space which is located at one side and lengthwise of the inner end portion of the intake passage, extends outwards from the inner extremity of said intake passage, and is in longitudinal alignment with the first mentioned slot-like space, said member being provided with an additional wall structure which cooperates with the two aforesaid wall structures to form a suction chamber adjacent to and in communication with the inner extremities of the exhaust and intake passages, and also provided with means for connecting the chamber to a source of gaseous fuel under substantially atmospheric pressure to the end that the fuel in the chamber is entrained by the air under super-atmospheric pressure directly before it enters said exhaust passage; a rigid strip-like part disposed in, and shaped conformably to, the first mentioned slot-like space, forming a part of said inner end portion of the one end part of the member, and provided at the end thereof that is farther from the inner extremity of said exhaust passage with a pivotal connection whereby it is permitted to swing laterally back and forth in order to vary the cross sectional area of said inner extremity of the exhaust passage; a second rigid strip-like part formed separately from the first mentioned strip-like part, disposed in, and shaped conformably to, the second mentioned slot-like space, forming a part of said inner end portion of the other end part of the member, provided at the end thereof that is farther from the inner extremity of the intake passage with a pivotal connection whereby it is permitted to swing laterally back and forth in order to vary the cross sectional area of said inner extremity of the intake passage, and having its distal end spaced from the adjacent distal end of the first mentioned strip-like part in order to form therebetween a passage between the suction chamber and the space between said inner extremities of the exhaust and intake passages; and means operative positively and conjointly to swing said rigid strip-like parts back and forth and also releasably to retain them in the various positions into which they are swung and including a member disposed in the suction chamber and having certain parts thereof pivotally connected to said distal ends of the rigid strip-like parts.

2. A Venturi type proportional mixer of the character described, comprising an elongated hollow member formed for the most part of cast metal and having one end part thereof shaped to form an outwardly flared exhaust passage, provided at its outer extremity with means for connecting the large outer end of the exhaust passage to a burner arrangement, and embodying at its inner end portion a wall structure that defines an elongated slot-like space which is located at one side and lengthwise of the inner end portion of the exhaust passage and extends outwards from the inner extremity of said discharge passage, said member having the other end part thereof shaped to form an inwardly tapered intake passage with the inner extremity thereof in alignment but spaced apart relation with the inner extremity of the exhaust passage, provided at its outer extremity with means for connecting the large outer end of the intake passage to a source of air under super-atmospheric pressure, adapted to direct the air under super-atmospheric pressure so that it enters and flows outwards through the exhaust passage after flowing through said intake passage, and embodying at its inner end portion a wall structure that defines an elongated slot-like space which is located at one side and lengthwise of the inner end portion of the intake passage, extends outwards from the inner extremity of said intake passage, and is in longitudinal alignment with the first mentioned slot-like space, said member being provided with an additional wall structure which cooperates with the two aforesaid wall structures to form a suction chamber adjacent to and in communication with the inner extremities of the exhaust and intake passages, and also provided with means for connecting the chamber to a source of gaseous fuel under substantially atmospheric pressure to the end that the fuel in the chamber is entrained by the air under super-atmospheric pressure directly before its enters said exhaust passage; a rigid strip-like part disposed in, and shaped conformably to, the first mentioned slot-like space, forming a part of said inner end portion of the one end part of the member, and provided at the end thereof that is farther from the inner extremity of said exhaust passage with a pivotal connection whereby it is permitted to swing laterally back and forth in order to vary the cross sectional area of said inner extremity of the exhaust passage; a second rigid strip-like part formed separately from the first mentioned strip-like part, disposed in, and shaped conformably to, the second mentioned slot-like space, forming a part of said inner end portion of the other end part of the member, provided at the end thereof that is farther from the inner extremity of the intake passage with a pivotal connection whereby it is permitted to swing laterally back and forth in order to vary the cross sectional area of said inner extremity of the intake passage, and having its distal end spaced from the adjacent distal end of the first mentioned strip-like part in order to form therebetween a passage between the suction chamber and the space between said inner extremities of the exhaust and intake passages; a screw extending transversely through the third mentioned wall structure and arranged so that the inner end thereof is disposed in the suction chamber and adjacent to the distal ends of the two strip-like parts; and an element disposed in the suction chamber and having a part thereof so connected to the inner end of the screw that the screw is rotatable relatively to the element while at the same time the element is shiftable with the screw in response to turning of the screw, said element having other parts thereof connected pivotally to the distal ends of said strip-like parts and being adapted when the screw is shifted inwards in response to turning movement in one direction conjointly to swing the strip-like parts so as to reduce the effective cross sectional areas of the inner extremities of the exhaust and inlet passages and when the screw is shifted outwards in response to reverse turning of the screw conjointly to swing said strip-like parts so as to cause them to increase the cross sectional areas of said inner extremities of the discharge inlet passages.

3. A Venturi type proportional mixer of the character described, comprising an elongated hollow member formed for the most part of cast material and having one end part thereof shaped to form an outwardly flared exhaust passage, provided at its outer extremity with means for connecting the large outer end of the exhaust passage to a burner arrangement, and embodying at its inner end portion a wall structure that defines an elongated slot-like space which is located at one side and lengthwise of the inner end portion of the exhaust passage and extends outwards from the inner extremity of said discharge passage, said member having the other end part thereof shaped to form an inwardly tapered intake passage with the inner extremity thereof in alignment but spaced apart relation with the inner extremity of the exhaust passage, provided at its outer extremity with means for connecting the large outer end of the intake passage to a source of air under super-atmospheric pressure, adapted to direct the air under super-atmospheric pressure so that it enters and flows outwards through the exhaust passage after flowing through said intake passage, and embodying at its inner end portion a wall structure that defines an elongated slot-like space which is located at one side and lengthwise of the inner end portion of the intake passage, extends outwards from the inner extremity of said intake passage, and is in longitudinal alignment with the first mentioned slot-like space, said member being provided with an additional wall structure which cooperates with the two aforesaid wall structures to form a suction chamber adjacent to and in communication with the inner extremities of the exhaust and intake passages, embodying a duct with one end thereof leading to and communicating with the suction chamber, and being provided with means for connecting the other end of the duct to a source of gaseous fuel under substantially atmospheric pressure to the end that the fuel that is delivered into the chamber from the duct is entrained by the air under super-atmospheric pressure directly before it enters said exhaust passage; a rigid strip-like part disposed in, and shaped conformably to, the first mentioned slot-like space, forming a part of said inner end portion of the one end part of the member, and provided at the end thereof that is farther from the inner extremity of said exhaust passage with a pivotal connection whereby it is permitted to swing laterally back and forth in order to vary the cross sectional area of said inner extremity of the exhaust passage; a second rigid strip-like part formed separately from the first mentioned strip-like part, disposed in, and shaped conformably to, the second mentioned slot-like space, forming a part of said inner end portion of the other end part of the member, provided at the end thereof that is farther from the inner extremity of the intake passage with a pivotal connection whereby it is permitted to swing laterally back and forth in order to vary the cross sectional area of said inner extremity of the intake passage, and having its distal end spaced from the adjacent distal end of the first mentioned strip-like part in order to form therebetween a passage between the suction chamber and the space between said inner extremities of the exhaust and intake passages; means operative positively and conjointly to swing said rigid strip-like parts back and forth and also releasably to retain them in the various positions into which they are swung; and an adjustable valve disposed in the aforesaid duct in the intermediate part of the elongated hollow member and adapted in connection with adjustment thereof to regulate or control the flow of gaseous fuel through said duct and into the suction chamber.

4. A Venturi type proportional mixer according to claim 3 and in which the duct in the elongated hollow member is serpentine and the adjustable valve is of the rotary type and is disposed in one of the bends of said duct.

References Cited in the file of this patent

UNITED STATES PATENTS

| | | |
|---|---|---|
| 1,360,445 | Rollins | Nov. 30, 1920 |
| 1,585,741 | Thewes | May 25, 1926 |
| 1,938,851 | McKee | Dec. 12, 1933 |
| 2,228,171 | Lutherer et al. | Jan. 7, 1941 |
| 2,321,483 | Haedike | June 8, 1943 |
| 2,424,654 | Gamble | July 29, 1947 |